Patented Oct. 12, 1954

2,691,689

UNITED STATES PATENT OFFICE 2,691,689

GLASS TANK FURNACE AND METHOD OF OPERATING THE SAME

Pierre Arbeit and Pierre La Burthe, Paris, France, assignors to Societe Anonyme des Manufactures des Glaces et Produits Chimiques de Saint-Gobain, Chauny & Cirey, Paris, France Application January 7, 1949, Serial No. 69,667

Claims priority, application France January 12, 1948

3 Claims. (Cl. 13—6)

The present invention relates to the continuous production of glass or vitreous materials in a tank.

As is known, for such production, there are three successive specialized zones provided in the tank, a first zone for melting the vitrifiable materials and having them react on one another, a second zone for evolving the bubbles so as to refine the glass, and a third zone for conditioning the molten glass by cooling it down to the temperature suitable for working it by rolling, gathering, feeder extraction, and so on.

To obtain the temperature rise required for freeing the glass from bubbles with a view to fine the glass, it has already been proposed that the fining zone, preferably delimited in the shape of a compartment or a cell, be provided with particular heating means.

The applicant has already proposed the use in the fining compartment of electric heating by Joule effect with submerged electrodes, such heating being used alone, or combined with surface heating. The electrodes may be, for instance, horizontal or vertical, in the neighbourhood of the level of the glass or of the bottom of the bath.

An object of the present invention consists in providing particular means for ensuring the communication from one compartment of the tank to another compartment. More especially, it relates to means preventing any movement of the fined glass contained in the fining cell or compartment back to the melting compartment, or of the already cooled glass contained in the conditioning compartment back to the fining cell or compartment.

As a fact such back movements have a tendency to lower the quality of the glass as they result in a disorganized fining, and they cause a useless increase of heat expense, which is much higher than is necessary for the simple elaboration of the glass.

In a tank furnace for the continuous production of glass comprising one or more fining cells or compartments electrically heated by Joule effect, there is provided, according to the present invention, means for the passage of molten glass from one compartment to the following compartment, including one or several conduits, each having a cross section sufficiently small to ensure to the glass stream, flowing through it as a result of the extraction of glass from the furnace, a speed sufficiently high to prevent any back current; the conduits through which the glass flows from one compartment to the following one are situated beneath the level of the glass bath in the former compartment.

The conduits thus placed between the compartments permit the passage of the glass from a compartment to the next one, whilst preventing the back movement of glass convection currents from a succeeding to a preceding compartment.

It is known, in a general way, that the formation of convection currents is unavoidable in a molten glass mass in which the heating is localized, and that these convection currents are necessary for obtaining a homogeneous bath, particularly in the fining cell or compartment, which has for its object to deliver to the working compartment a glass free from bubbles and absolutely homogeneous. The improvement according to the present invention does not eliminate the convection currents, which are useful within the fining compartment, but it bars back currents between compartments which would be caused by convection.

We ascertained that it is advantageous to provide conduits the section whereof is such that the average speed of the glass flow caused by extraction will, between the fining compartment and the conditioning compartment, be of the order of 1 centimeter per second or higher, and between the melting compartment and the fining compartment will be of the order of a few millimeters per second or higher.

Another object of the present invention is to control the outflow of such conduits, particularly by providing the possibility of controlling their section. In fact it may be required, according to the production schedule, to increase or to decrease the quantity of glass which is present in the fining cell or compartment without interrupting the production of crude glass in the melting compartment. On the other hand it may be required to momentarily vary the quantity of fined glass present in the working compartment or compartments without decreasing the mass of the fining bath. In particular, it is possible, as already proposed by us, to provide a tank with several fining cells fed by a common melting tank, such cells permitting the addition to the respective fining baths of additional substances conferring on them different colors or natures. Also, there may be a plurality of working compartments. The total or partial obturation of the intermediate conduits permits the feeding of all the cells or each compartment according to the rate best suited to it in view of the production schedule.

A further object of the present invention relates to the constitution of the conduits themselves.

We ascertained that it is possible to build such conduits in the shape of tubes having a small cross section, preferably cylindrical, inserted into the depth of the walls of the two compartments to be connected. The tubes may be made, for instance, of first quality refractory material by casting.

A still further object of the present invention is to provide the communication between two successive compartments of a tank furnace, whether it is heated electrically or by any other means, such as flames, by means of conduits made of carbon, and in particular of graphite.

In this latter case, it is advisable to cover the graphite tube, when its outer surface is in contact with the surrounding air, with a sleeve made of refractory material, thus thermally insulating it and protecting it from oxidation. Such conduits may be easily taken away and replaced, even when the molten glass remains in the tank. In such a case the glass is solidified in the desired region, by plunging into it metal tubes through which cold water circulates.

The accompanying drawing diagrammatically shows as a mere non-limitative example three embodiments of the invention.

Figure 1:
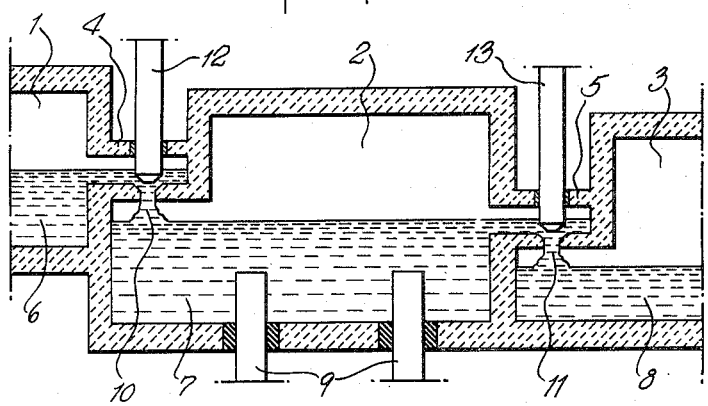
Fig. 1 shows a tank with three separate compartments, with means for controlling the section of the conduits and consequently the outflow.

Fig. 1 shows diagrammatically a partial longitudinal section of a continuous glass tank. It shows the end of the melting compartment 1, the fining cell 2 and a part of the conditioning compartment 3.

Compartments 1 and 2 are connected by the conduit 4, compartments 2 and 3 are connected by the conduit 5, the cross section of conduits 4 and 5 being small in respect to the cross section of the cell. In the illustrated embodiment the conduit 4 is placed at such a level that the level of the bath 6 in the melting compartment 1 is higher than the level of the bath 7 in the fining cell 2.

The conduit 5 is placed in a similar manner, so that the level of the bath 7 in the fining cell 2 is above the level of the bath 8 in the conditioning compartment 3.

The conduits 4 and 5 are provided in their bottom with orifices 10 and 11 having vertical axes.

The fining cell 2 is electrically heated by means, for example, of horizontal electrodes or of vertical electrodes 9.

The rough glass 6, produced in compartment 1 by melting and reaction of the vitrifiable materials, flows through conduit 4 into compartment 2 where it gets mixed into the fining bath 7; the glass from the fining bath 7 comes through conduit 5 into the bath 8 of the working compartment 3. The electrodes 9 are placed in the bottom of compartment 2 through tight boxes not shown and penetrate up to a controllable height into the bath 7, so as to feed it with electric current which by Joule effect causes the temperature to rise in the bath as required for its fining. Only two vertical electrodes are shown, but there may be of course a greater number of electrodes. As a consequence of the fall of the glass flowing from one compartment into the next one, any possibility of back current of the glass is excluded.

For controlling the outflow of the molten glass through conduits 4 and 5, the openings 10 and 11 may be more or less obturated by corresponding means 12 and 13. The openings 10 and 11 may have a long section and in that case means 12 and 13 are shaped as flat valves, or else their section may be circular, the means 12 and 13 being then shaped as plungers. Such obturating means 12 and 13 may be driven by any suitable mechanical means not shown, for controlling the outflow of molten glass in conduits 4 and 5 according to the production schedule. The orifice 11 through which the fining compartment communicates with the working compartment is also shown at a level higher than the glass in the latter compartment.

It must be noted that, even if the orifices were submerged, any back movement of a part of the glass through the conduits would be impossible as, by reason of the small section of the conduits, the speed of the glass running therethrough is higher than the speed of the convection currents, as it is regulated to fulfill the speed conditions hereinabove indicated.

Figure 2:
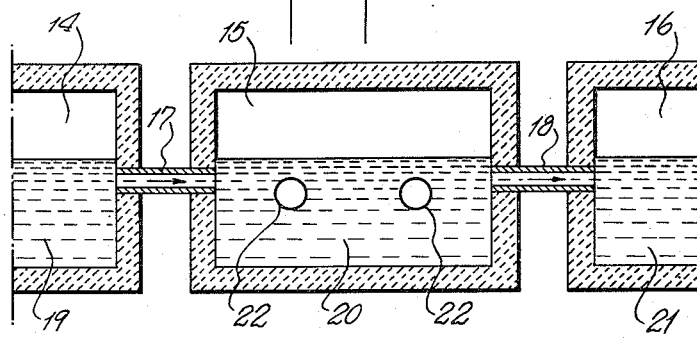
Fig. 2 shows a furnace with three compartments, with cylindrical conduits.

In Figure 2, the three melting, fining and working compartments are respectively referred to by numerals 14, 15, 16; they are connected by small section conduits 17 and 18, each being constituted of a single piece of refractory material. Such conduits are placed below the free level of the baths 19, 20 and 21. As a result of their small section, conduits 17 and 18 permit the passage of a comparatively quick forward current, which prevents the back movement of the glass. Such embodiment has also the advantage of preventing the passage into the fining compartment 15 of nonmelted vitrifiable materials floating on the melting bath 19, and also of preventing the passage into the working compartment 16 of foam which may gather on the free surface of the fining bath 20, as a result of the evolution of gases caused by the intense heating resulting from the passage of the electric current between the electrodes 22.

Figure 3:
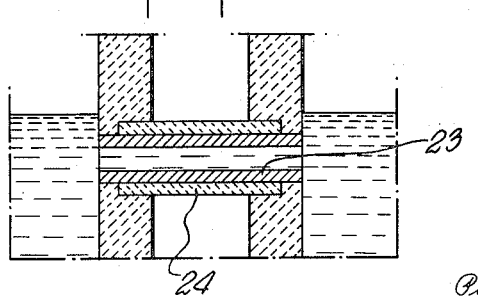
Fig. 3 shows a communication conduit formed of a graphite tube with a protecting sleeve.

In Fig. 3, the tube 23 made of graphite forms the inside part, in contact with the molten glass, of a communication conduit of small section between two successive compartments of a tank furnace. The tube 23 is covered by a sleeve 24 of refractory material, protecting it from oxidation by the surrounding air, and heat insulating it. The use of an insulated graphite tube affords the advantage of equalizing the temperatures at all points of the conduit, preventing any formation of convection currents.

We claim:

1. In a glass furnace in which operations such as melting, fining and working of glass are carried out, and in which glass flows along the furnace as it is withdrawn in finished condition, a plurality of separate tanks constructed and arranged for the carrying out of a plurality of such separate operations, said separate tanks being connected only by horizontal conduits beneath the glass level, and each said conduit being a small pipe impermeable to wandering glass currents.

2. The method of manufacturing glass that includes the steps of melting, fining and working the glass, the glass proceeding from a melting zone to a fining zone to a working zone and being withdrawn from the working zone, fining the glass by Joule effect, and flowing the glass from zone to zone in small, submerged streams impermeable to wandering currents in the zones, said streams constituting the sole connections between the zones.

3. A glass furnace of continuous type having a single glass level, in which the glass raw materials are admitted at one end and withdrawn from the other after undergoing melting, fining and conditioning to working temperature, said furnace having a separate tank for melting, a separate tank containing electrodes immersed in the glass for fining, and a separate tank for conditioning, said separate tanks being connected beneath the glass level only by little carbon tube means, horizontally arranged, said tube means being of such section that the withdrawal of glass at the working end of the furnace imparts to the glass in the tube connecting the working and fining tanks a minimum velocity of 1 cm./sec. and to the glass in the tube connecting the fining and melting tanks a minimum of a few mm./sec.

References Cited in the file of this patent

UNITED STATES PATENTS

| Number | Name | Date |
|---|---|---|
| Re. 12,323 | Richardson | Feb. 28, 1905 |
| 469,454 | Rogers | Feb. 23, 1892 |
| 706,283 | Voelker | Aug. 5, 1902 |
| 865,016 | Clark | Sept. 3, 1907 |
| 1,069,255 | Heroult | Aug. 5, 1913 |
| 1,552,555 | Grauel | Sept. 8, 1925 |
| 1,593,054 | Arbeit | July 20, 1926 |
| 1,611,328 | Arbogast | Dec. 21, 1926 |
| 1,739,343 | Baily | Dec. 10, 1929 |
| 1,851,575 | Greene | Mar. 29, 1932 |
| 1,872,664 | Brown | Aug. 23, 1932 |
| 1,880,541 | Wadman | Oct. 4, 1932 |
| 1,928,289 | Henry et al. | Sept. 26, 1933 |
| 1,944,855 | Wadman | Jan. 23, 1934 |
| 2,225,617 | Borel et al. | Dec. 24, 1940 |
| 2,383,168 | Slayter | Aug. 21, 1945 |

FOREIGN PATENTS

| Number | Country | Date |
|---|---|---|
| 87,311 | Germany | July 25, 1895 |
| 224,499 | Switzerland | Mar. 1, 1943 |
| 880,749 | France | Jan. 11, 1943 |